Figure 4:
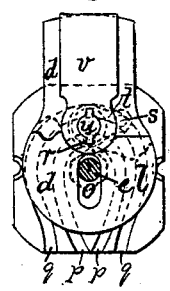

3 Sheets--Sheet 1.

C. W. GLIDDEN & H. P. FAIRFIELD.
Heeling-Machines.

No. 139,058. Patented May 20, 1873.

Witnesses.
M. W. Frothingham.
L. H. Latimer.

Inventors.
C. W. Glidden
H. P. Fairfield
By their attys.
Crosby & Gould

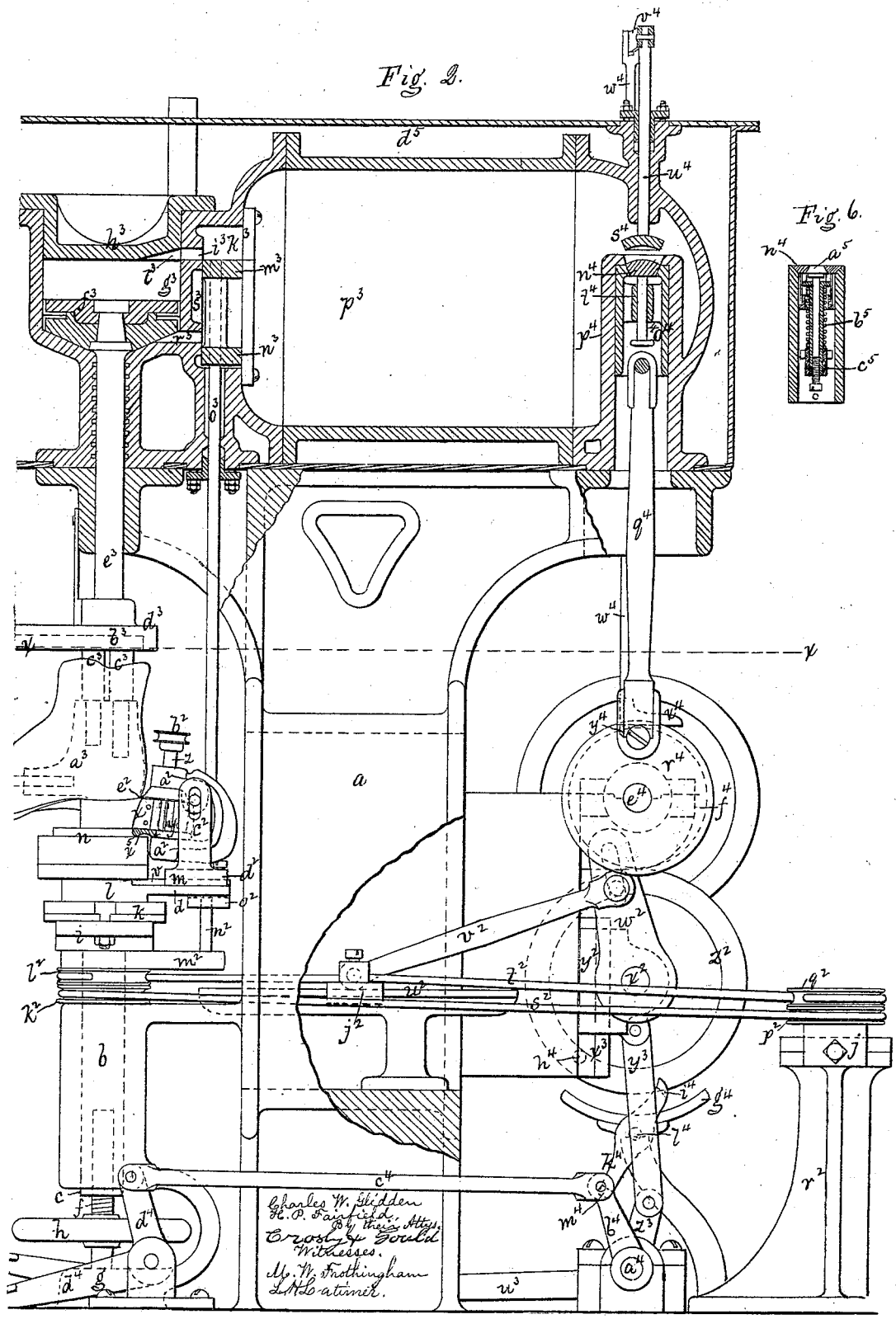

3 Sheets--Sheet 3.
C. W. GLIDDEN & H. P. FAIRFIELD.
Heeling-Machines.
No. 139,058. Patented May 20, 1873.
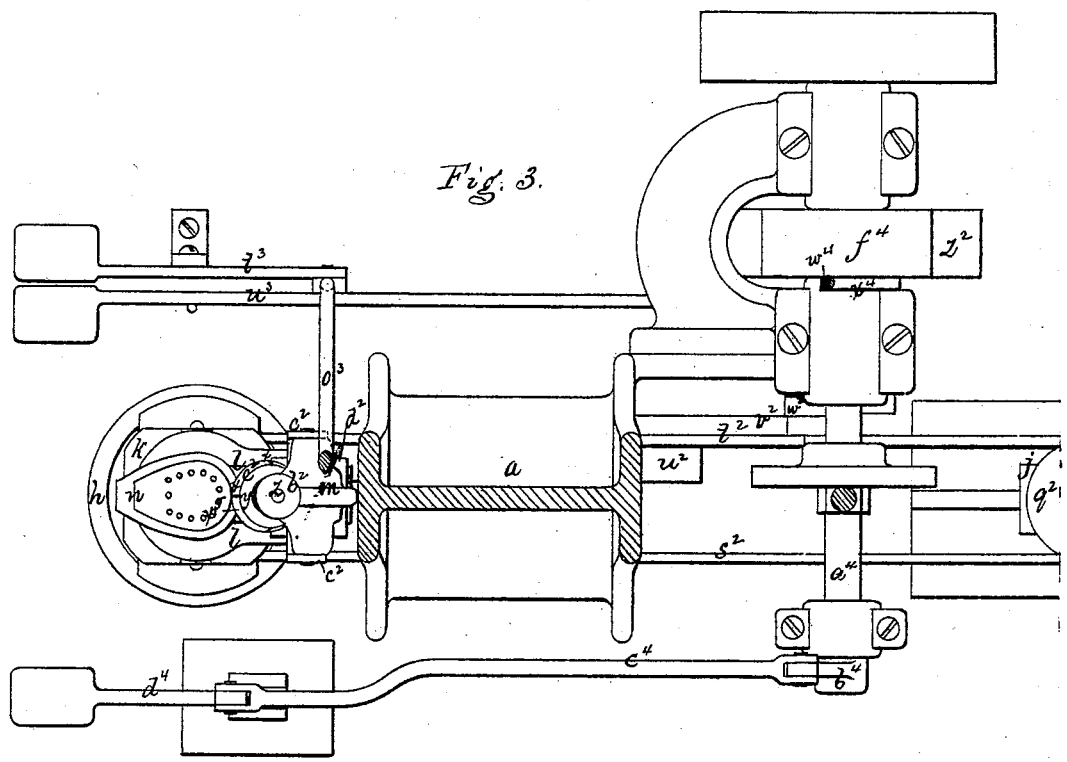
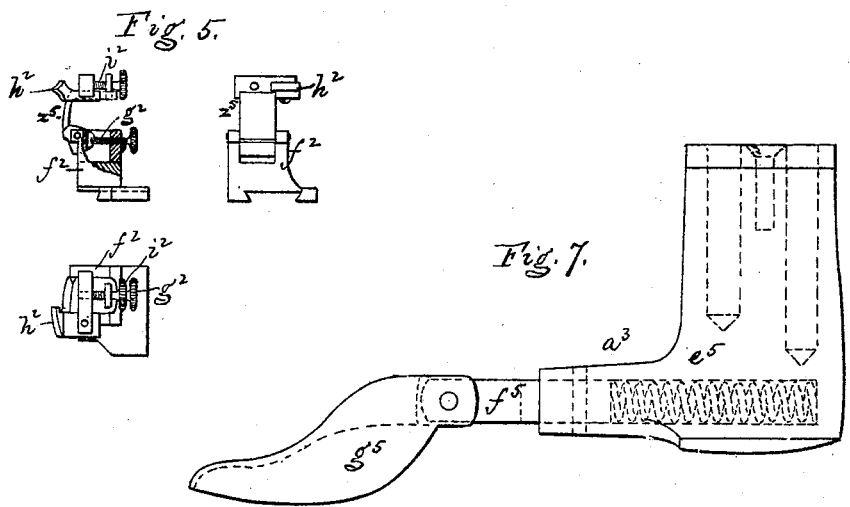
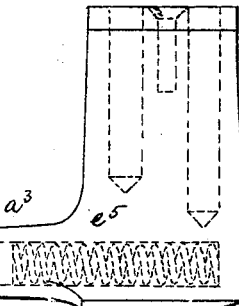
Witnesses.
M. W. Frothingham.
L. H. Latimer.
Inventors.
Charles W. Glidden.
Hadley P. Fairfield.
By their Attys.
Crosby & Gould

UNITED STATES PATENT OFFICE.

CHARLES W. GLIDDEN, OF LYNN, AND HADLEY P. FAIRFIELD, OF BOSTON, ASSIGNORS TO JAMES W. BROOKS, TRUSTEE, OF BOSTON, MASS.

IMPROVEMENT IN HEELING-MACHINES.

Specification forming part of Letters Patent No. 139,058, dated May 20, 1873; application filed April 19, 1873.

*To all whom it may concern:*

Be it known that we, CHARLES W. GLIDDEN, of Lynn, Essex county, and HADLEY P. FAIRFIELD, of Boston, Suffolk county, all in the State of Massachusetts, have invented certain Improvements in Heeling-Machines; and we do hereby declare that the following, taken in connection with the drawing which accompanies and forms part of this specification, is a description of our invention sufficient to enable those skilled in the art to practice it.

The invention relates to the organization of a machine for heeling boots and shoes, and for trimming the edges of the heels; a part of the invention being, also, applicable to a heeling-machine that does not effect the trimming, while other parts are more or less applicable to a trimming-machine not necessarily designed to attach the heel. In the organization shown in the drawing, the trimming mechanism is reciprocated around the curved part of the heel automatically; and one part of the invention consists in combining, with the mechanism that holds the boot firmly in position after the nailing, a trimming mechanism having reciprocating movement from the driving-shaft, to carry the cutter or cutters around the curved heel-edge. This constitutes one part of the invention. In the organization shown in the drawing, the carriage that carries the trimming mechanism turns upon a stationary plate carrying two pattern or guide grooves, into which grooves two pins project down from the trimming mechanism, these pins keeping the mechanism or cutters at the proper angle of presentation along the whole eccentrically-curved edge upon, or to be produced upon, the heel. This method of guiding the trimming tool or tools constitutes another feature of the invention. In the organization shown in the drawing, the boot to be heeled is jacked upon a last, into which two pins project from a plate fixed to the foot of a piston-rod extending from a piston working in a compressed-air cylinder, said cylinder being supplied with compressed air from a compressed-air tank, and such supply being controlled and regulated by a mechanism accessible to the operator who tends the machine; the air-compressor pump for compressing air into the tank preferably forming part of the machine, the connecting-rod of the piston of such pump being jointed to a crank-wheel upon the driving-shaft. The descent of the piston of the compressed-air cylinder drives the boot or shoe down, and thereby effects the union of the heel to the boot or shoe; and the arrangement of the air-compressing and the compressed-air-driven mechanism, and details relating thereto, constitute parts of the invention. The invention further consists in various details of construction and arrangement of the mechanism, which will be best understood from the specific description thereof.

Figure 1:
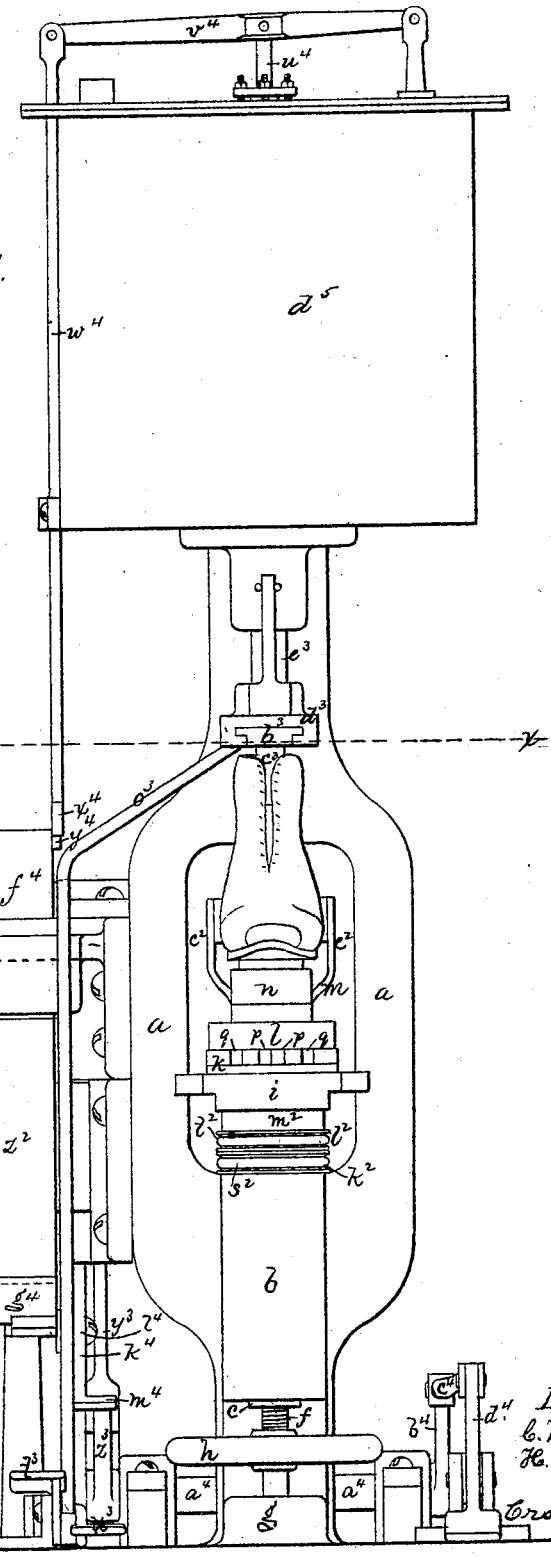

Figure 1 shows the machine in front elevation. Fig. 2 is a side and sectional elevation of it. Fig. 3 is a sectional plan on the line $x\ x$.

$a$ denotes a strong stand, having at its front end a vertical bearing, $b$. In this bearing is a rod or spindle, $c$, supported upon the top of a screw, $f$, (turning upon a step, $g$;) rotation of this screw by means of a wheel, $h$, fixed upon it raising or lowering the spindle to adjust the height of the mechanism supported upon its top, the spindle being kept from rotation by a feather and spline or any other suitable connection. At the top of the spindle is a head, $i$, to which is fixed the guide-plate $k$, for controlling the presentation of the trimming mechanism. Upon the top of this guide-plate rests and turns a slide or carriage, $l$, with which is connected a frame, $m$, that carries the cutter or cutters. Through the guide-plate $k$, and through a slot in the carriage $l$, a bolt-pin, $e$, passes loosely, said bolt-pin having at its top the pattern and nail-blocks $n$, a nut and head in the bolt $o$ confining the parts together. In the guide-plate $k$ are two guide-grooves, $p\ q$, formed as shown in Fig. 4, and having extending into them (respectively) two pins, $r\ s$, projecting from an arm, $t$, at the bottom of a pin, $u$, passing through and turning freely in the carriage-plate $d$. To the top of this pin the cutter-frame plate $v$ is fixed, and, as the carriage turns, the movement of the pins $r\ s$, with the carriage $l$, turns the frame $m$, (relatively to the carriage,) the grooves being so made that by their action upon the pins the cutter-frame is so turned as to keep the cutters properly presented to cut the whole length of the eccentric edge of the heel.

The cutter shown in the drawing, Figs. 2 and 3, is a rotary cutter, having radial or other properly-shaped blades $x$ projecting from a cutter-head, $y$. The cutter-head is fast on a shaft, $z$, turning in bearings $a^2$, and has a guide-plate, $x^5$, which is held against the edge of the heel-plate $n$, to guide the action of the cutters. The shaft $z$ carries a pulley, $b^2$, to which a rotary movement is imparted by a suitable connection with the driving-shaft. The cutter-head swivels loosely on arms $c^2$ extending up from a slide, $d^2$, which is fastened to the plate $v$, said slide being adjustable to vary the position of the cutter-head. The cutter-head has a flange, $e^2$, that travels in the rand-crease. A non-rotative cutter, $z^5$, may be employed, such cutter being preferably constructed and arranged as seen in Fig. 5. The cutter is pivoted to the head $f^2$ and tips freely forward, the extent of its tipping being regulated by a set-screw, $g^2$. At the top of the cutter is a rand-guide, $h^2$, which, by means of an adjusting-screw, $i^2$, is variably positioned with reference to the cutting-edge of the cutters.

The swing movement of the carriage is reciprocatively effected as follows: Upon the pin or shaft $c$ are two grooved wheels, $k^2$ $l^2$, fastened to an arm, $m^2$, and turning loosely on the pin $c$. From the arm $m^2$ extends a pin, $n^2$, that enters a slot, $o^2$, in the carriage $l$, so that the rotative movement of the wheels effects the rotative movement of the carriage $l$ and its cutter-frame $m$. The two wheels or pulleys $k^2$ $l^2$ are connected (respectively) to two similar pulleys, $p^2$ $q^2$, turning on a pin extending up from a slide, $j$, fastened to a rail at the top of a post, $r^2$, the connection being effected by two bands, $s^2$ $t^2$, one of which passes in one direction around the upper pulleys $k^2$ $p^2$, and the other in the opposite direction around the pulleys $l^2$ $q^2$. The belt $t^2$ passes through and is fastened to a slide, $j^2$, that traverses on a horizontal guide-rail, $u^2$, and this slide is connected by a link, $v^2$, to a crank-arm, $w^2$, on a shaft, $x^2$, that turns in a suitable bearing, $y^2$, and has at its outer end a wheel, $z^2$, rotation of this shaft effecting the reciprocation of the slide, and the movement of the belts by the action of the slide turning the wheels $k^2$ $l^2$ in opposite directions, and thereby reciprocating the trimming mechanism. The extent of movement of the cutting mechanism is adjustably determined by a slot in the crank-arm and a bolt extending through said slot from the link. The movement of the trimming mechanism is produced at proper times, as will be hereafter described.

The immediate mechanism for uniting the heel to the sole is, or may be, substantially like that shown in United States patent No. 103,735, dated May 31, 1870, (embracing invention of C. W. Glidden,) and need not be described. But the last for holding the boot or shoe, and the mechanism that drives down said last to compress the heel and insert the nails, are peculiar. The last $a^3$ is connected to a slide, $b^3$, by pins $c^3$ extending from the slide, and said slide slips into the groove of a plate, $d^3$, fastened upon the foot of a piston-rod, $e^3$, extending down from a piston, $f^3$. This piston works in a cylinder, $g^3$, having a head, $h^3$, just above the under surface of which is a port, $i^3$, leading from a valve cylinder or chest, $k^3$, the head being cut away at $l^3$, for this port to communicate with the cylinder. In the valve-cylinder are two valves, $m^3$ $n^3$, on a valve-stem, $o^3$, and the valve-chest $k^3$ opens from a tank, $p^3$, into which air is compressed, or to which compressed air is supplied by or from any suitable air-compressing mechanism. The valve-cylinder communicates with the tank through suitable air passages or ports. When the valves are in the position shown at Fig. 2, compressed air from the tank and valve-cylinder enters the cylinder $g^3$ through the port $i^3$, and drives the piston down with force sufficient to drive the nails and compress the heel. When the piston descends, a port, $r^3$, at the bottom of the cylinder $g^3$ is open to an exhaust-port, $s^3$, to permit the air beneath it to escape into the atmosphere through a suitable pipe. After the piston has descended, the valve stem or rod $o^3$ is thrown up, carrying the valve $m^3$ above the inlet $i^3$, and closing the inlet from the tank to the valve-chest $k^3$, opening the port $l^3$ to the exhaust-port, and the port $r^3$ to the tank; compressed air will then enter the cylinder below the piston, and throw up the piston and the last. To enable the movements of the last thus produced to be entirely within the control of the operator, the valve-stem $o^3$ passes down through the tank to two levers, $t^3$ $u^3$, (through suitable stuffing-boxes,) to both of which the rod or stem is jointed, the respective levers being so fulcrumed that depression of the front end of one draws down the valve-stem and valves, and depression of the adjacent front end of the other raises the valve-stem and its valves. The operator, having prepared and jacked the boot, and placed it and the heel in position in the machine, depresses the lever $t^3$, thereby opening the port $i^3$ to the valve-cylinder and tank, the compressed air entering the cylinder $g^3$ above the piston, and driving down the piston, as before described. This being effected, he depresses the lever $u^3$, and thereby raises the valves, and the compressed air then enters the cylinder below the piston, and raises the piston and the last, enabling the boot to be removed. The depressing of either lever raises the other, so that the operator, to produce either movement of the valves, has only to depress the proper lever. If the trimming mechanism be used with the machine, the lever $t^3$ is left down until the trimming is effected. During the heel-nailing operation, the trimming mechanism is inactive, and, to keep it thus inactive, but in a position to be instantly thrown into action, the mechanism is arranged as follows: The shaft of the wheel $z^2$ turns in a bearing, $y^2$, movable vertically on a guide, $x^3$, and the bearing has jointed to it a link, $y^3$, that connects it with an arm, $z^3$, at one end of a horizontal shaft, $a^4$, at whose other end is an arm, $b^4$, connected by a link, $c^4$, with the vertical arm of a lever, $d^4$, the other arm of which is a pedal, accessible to the operator standing at the front of the machine. Over the wheel $z^2$ is a friction-wheel, $f^4$, on the driving-shaft $e^4$, and when the lever $d^4$ is depressed the wheel $z^2$ is thereby raised, and, coming into contact with the wheel $f^4$, said wheel is rotated, and the trimming mechanism thereby thrown into action, which action is stopped as soon as the operator releases the lever $d^4$, the wheel $z^2$ dropping from contact with the wheel $f^4$ by gravity, and dropping against a brake, $g^4$. When the wheel is raised the link $y^3$ and arm $z^3$ are brought into vertical position, and, the wheel $z^2$ being of such diameter as to impart one complete reciprocation to the trimming mechanism by a single rotation, a pin, $h^4$, projecting from the side of the wheel, strikes a projection, $i^4$, extending from the top of the upper arm of a lever, $k^4$, pivoted at $l^4$, and, having a projection, $m^4$, extending from its lower arm, the movement of the lever, effected by the contact of the pin $h^4$ therewith, throws the projection $m^4$ against the joint of the link $y^3$ and arm $z^3$, and knocks the levers out of vertical line, the wheel $z^2$ then falling by gravity. The lever is held in normal position for the pin $h^4$ to strike it by a suitable spring, and the pin $h^4$, after moving the lever, slips by the projection $i^4$. The driving-shaft operates the piston of the air-compressing pump, said pump supplying compressed air to the tank, which tank, by the valvular mechanism, connects with the cylinder whose piston drives the nailing and compressing mechanism. The piston $o^4$ of the pump-cylinder $p^4$ is connected, by a rod, $q^4$, with the crank-wheel $r^4$ on the end of the driving-shaft. The top of the pump-cylinder opens directly into the tank, or into a passage directly connecting therewith, being separated therefrom by a valve, $s^4$, that is frusto-conical in form, and fits a corresponding formation in the cylinder-top, so as to rise from said top. The piston is hollow, and has a similar valve, $n^4$, similarly fitting into and closing its upper end. The valve is fixed to the end of a stem sliding in an open guide-frame, $t^4$, that is within the piston, said frame guiding the valve as it rises from the piston and as it returns to its seat, and the outward movement of the valve is controlled by any suitable stop. When the piston is forced up it drives the air above it and compresses said air until the valve $s^4$ is raised, when the compressed air passes into the tank. To lift the valve $s^4$ positively at each upward stroke of the piston said valve is fixed to a rod, $u^4$, jointed at top to a lever, $v^4$, one end of which is jointed to a lifter-rod, $w^4$, having, at its foot, an arm, $x^4$, which arm, as the wheel $f^4$ turns, is struck by a lifter-pin, $y^4$, said pin raising the rod $w^4$, and the lever $v^4$, and the rod $u^4$, and valve $s^4$, said rise taking place during the last part of the rise of the piston, and the piston-valve being made crowning, or of such form that it passes slightly above the top of the piston-cylinder, such rise of the piston-valve and of the valve $s^4$ insuring the expulsion of all the air from the piston-cylinder at each rise of the piston, and obviating the necessity of adjustable change of the piston-stroke to insure this result. As the piston starts down the pressure of air upon the valve causes it to fall to its seat. To relieve the piston when the compression of the air in the tank has reached any suitable degree, the piston may be provided with a relief-valve, as seen in Fig. 6. As the piston descends its valve $n^4$ opens for entrance of air to the space above the piston. The relief-valve $a^5$ is held up by a spring, $b^5$, and is free to move down from the valve $n^4$ against the stress of said spring. By adjusting the spring to the proper tension the valve will open when the pressure of the compressed air reaches a certain point. To adjust the stress of the spring to variably regulate such opening of the valve at variable pressures, an adjusting screw-nut, $c^5$, may be used, the pressure against the valve tending to keep it against its seat, being varied by turning the nut. By such arrangement the driving-shaft keeps up its rotation to effect the movements of the nailing mechanism and the movements of the trimming mechanism, irrespective of the action of the pumping mechanism, such mechanism being relieved whenever the compression of the air is sufficient, and compressing air into the tank whenever the air has not attained the maximum degree of pressure.

To cool the compressed-air tank $p^3$, and the pump-cylinder $p^4$, and piston-cylinder $g^3$, the tank and cylinders may be placed in a cold-water tank, $d^5$, provided with water from any suitable source of supply.

The last $a^3$, (see Fig. 7,) has extending from the part $e^5$ a pin, $f^5$, to which is jointed a toe-piece, $g^5$, the joint permitting the toe-piece to tip, to vary its vertical angle for different styles of boots or shoes, and the pin is made movable in the piece $e^5$, and is pressed forward by a spring, (its movement being limited by suitable stops,) the spring enabling the last to be shortened to enter a boot or shoe, and causing the last to hold the boot or shoe firmly when introduced.

I claim—

1. The plate $k$, made with the two grooves, $p$ $q$, for controlling the presentation of the cutting mechanism, substantially as described.

2. In combination with the boot-holding mechanism and the guide mechanism for controlling the movement of the cutting mechanism, the reciprocating rotary cutter and its bearings $a^2$ and guides $e^2$ $x^5$, all arranged substantially as shown and described.

3. The cutter $z^5$, having the adjustable guide $h^2$, arranged substantially as shown and described.

4. In combination with a boot-holding and heel-nailing mechanism, a trimming mechanism automatically reciprocated by means substantially as described.

5. In combination with the boot-holding and heel-nailing mechanism, the trimming mechanism driven by the belts and wheel and crank-connections, substantially as shown and described.

6. In combination with the trimming mechanism and the nailing mechanism, the wheel $z^2$, thrown into and from connection with the driving-wheel $f^4$ by means substantially as shown and described.

7. The heel-nailing mechanism and the heel-trimming mechanism, actuated directly and indirectly from the driving-shaft $e^4$ by means substantially as described.

8. In combination with the nailing mechanism, the piston-cylinder $g^3$, piston $f^3$, valve-chest $k^3$, valve or valves $n^3$, and tank $p^3$, substantially as described.

9. The last $a^3$, made with the yielding toe-piece pressed forward by the spring and jointed, substantially as shown and described.

10. The combination and arrangement, substantially as shown and described, of the nailer-rod $e^3$, piston $f^3$, cylinder $g^3$, ports, valves, and valve-chest, tank $p^3$, pump $p^4$ and its piston, connecting-rod $q^4$, crank-wheel $r^4$, and driving-shaft $e^4$.

11. In combination with the nailing mechanism actuated by the piston $f^3$, the valve mechanism operated by the foot-levers, substantially as shown and described.

12. In combination with the wheel $z^2$, the brake $g^4$ and the mechanism for effecting the rise and release of the wheel, substantially as shown and described.

Executed this 12th day of April, A. D. 1873.

C. W. GLIDDEN.
HADLEY P. FAIRFIELD.

Witnesses:
FRANCIS GOULD,
M. W. FROTHINGHAM.